Jan. 4, 1938.   P. A. DUBUS   2,104,027
PROCESS OF AND APPARATUS FOR TREATING CRUSTACEA
Filed March 31, 1934

Inventor,
Peter A. Dubus,
By Ivan P. Tashof,
Attorney

Patented Jan. 4, 1938

2,104,027

UNITED STATES PATENT OFFICE 2,104,027

PROCESS OF AND APPARATUS FOR TREATING CRUSTACEA

Peter A. Dubus, New Orleans, La.

Application March 31, 1934, Serial No. 718,509

24 Claims. (Cl. 17—2)

This invention relates to a process and apparatus for extracting the meat from the shells of crustacea.

One important object of the invention is to provide a novel process wherein the meat is automatically washed at the same time it is extracted from the shells.

A second important object of the invention is to provide a novel process of this character wherein the meat is chilled as it is washed.

A third important object of the invention is to provide a novel process for this purpose wherein the meat is successively extracted, washed and chilled, and finally dried.

A fourth important object of the invention is to provide an improved construction of apparatus for extracting the meat from the shells of crustacea whereby a novel and improved arrangement of holders and drawers is obtained.

A fifth important object of the invention is to provide a novel machine of this class wherein each holder and drawer may be removed as a unit.

A sixth important object of the invention is to provide a novel holder and drawer arrangement wherein the drawer is readily separable from its associated holder when removed from the remainder of the machine.

With the above and other objects in view the invention consists of a novel process for the purpose described and in an apparatus having certain novel details of construction and combinations of elements hereinafter fully described and illustrated in the accompanying drawing, both process and apparatus being specifically pointed out in the claims.

In the accompanying drawing like characters of reference indicate like parts in the several views, and:—

Figure 1:
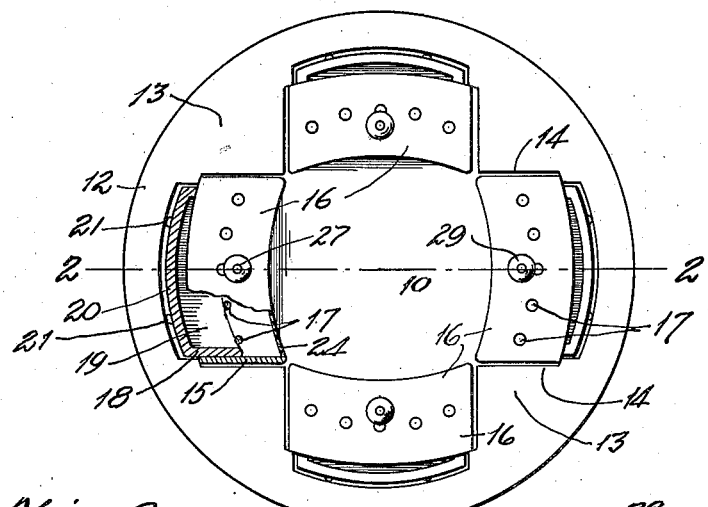
Figure 1 is a plan view partly in horizontal section showing one preferred form of the bowl of the apparatus.

In the present disclosure of the apparatus only those parts essential to an understanding of the device and its operation in carrying out the process have been shown and it will be seen that there is provided a bowl or container having a flat bottom 10 and a vertical peripheral wall 11. On the wall is fitted an open top 12 provided at regularly spaced intervals on its interior with inwardly projecting ribs 13 dividing the outer part of the interior of the top into channels 14.

These channels each serve to hold in position a body holder and meat drawer. Each body holder has a pair of vertical side walls 15 connected at their upper and lower ends by arcuate members 16. The inner and outer sides of this body holder are arranged so that the holder forms a frame open at its inner and outer sides. The arcuate members are connected by spaced bars 17 arranged in a series concentric to the bowl. Each drawer similarly has vertical sides 18 and arcuate top and bottom ends 19 connecting the sides 18. The outer side of each drawer is closed by a perforated side 20 which is provided with lugs or bosses 21 which hold it spaced from the wall 11.

In order to retain the body of the crustacean against the bars 17 there is provided an inner cover 24 having a spring-clip 25 which may be fitted against pins 26 projecting from the top and bottom members 16. The spring-clip acts to hold this cover in place and a knob 28 forms a handle for its removal. The outer frames are likewise provided with knobs 27 and 29 for their removal. The covers 24 have large openings 30 so that the wash water may flow readily therethrough.

The drawer is of such dimensions that it slidably fits in the outer side of the corresponding body holder.

The bowl has its base 10 supported by a belt pulley 22 mounted on a vertical shaft 23 supported in suitable bearings which it is not deemed necessary here to show.

Outside of the bowl there is provided a stationary water receiving casing or drain pan having a cylindrical side wall 31 and an annular trough-like bottom 32 the floor of which slopes downwardly from an inner flange 33 to the wall 31. This casing is stationarily supported on legs 34 and adjacent the wall 31 there is provided, in the bottom 32, a drain opening 35 so that a pipe may be connected to the drain pan to dispose of spent wash water collected in said pan. In the wall 11 of the bowl are provided rows of drain holes 36 so that, as the bowl is rotated, water will be driven by centrifugal force through the holes 36 to pass into the drain pan and be thus drawn off.

In order to supply wash water there is provided a perforated tube 37 which may have its lower end socketed in a suitable depression in the center of the bowl bottom. This tube 37 is connected by a flexible tube or hose 38 with a suitable source of water supply. The hose 38, being flexible, permits the tube to be inverted in and removed from the bowl at will. A valve 39 is preferably provided in the hose.

Figure 2:
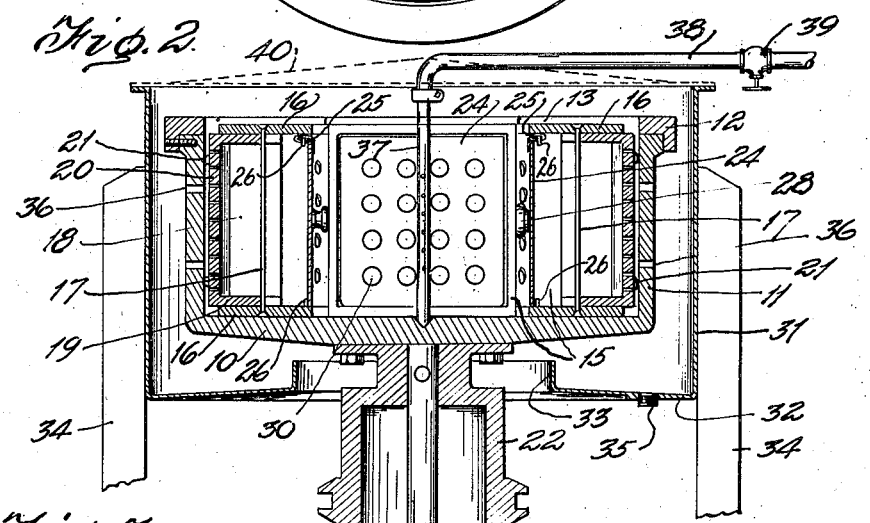
Figure 2 is a section on the line 2—2 of Figure 1, showing the bowl and drain pan.
Figure 3:
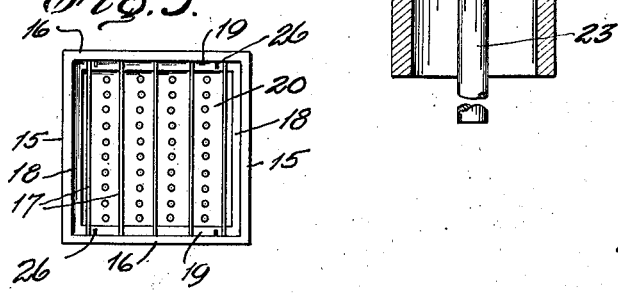
Figure 3 is an inner face view of one of the removable devices for holding the crustacea bodies and meat, the cover being removed.

Under certain conditions of operation it is desirable to remove the washing nozzle and close the upper end of the drain pan and, to this end a cover 40 is indicated in dotted lines on Figure 2.

In carrying out the present invention the crustacea are boiled and then cut in half in any appropriate way so as to open the meat containing lobes. The crustacea are then placed in the holders against the inner sides of the bars 17 with the drawers in place and the covers 24 are placed in position. The bowl is then spun on its axis at about 1800 revolutions per minute. Of course, the number of revolutions per minute can be varied and under some circumstances may be much higher. Due to centrifugal action the meat is thrown out of the shells and passes between the rods or bars 17 into the drawer. As this happens, the pipe 37 is inserted and cold water is sprayed into the bowl against the bodies and meat and washes and chills the meat. The water passes through the masses of meat and out of the drawers through the perforations in the outer walls of the drawers and then into the drain pan through holes 36. When all the meat has been extracted the water spray is turned off, the pipe removed and the spinning of the bowl continued till all the water is removed from the meat by centrifugal force and the meat thus left in a dried condition. The spinning of the bowl is now stopped, the drawers and holders removed and separated and the meat dumped from the drawers into a suitable receptacle, the shells being of course discarded.

It is desired to point out that one of the advantages of the present invention is that the meat after being parboiled is kept warm for only a relatively few minutes as it is immediately placed into the centrifugal machine and cold water is sprayer thereon as the meat is removed from the shells of the crustacea. After the crustacean, for example crab meat, is taken from the machine it is placed in the refrigerator.

While the present invention is applicable in general to crustacea, it is of particular value in the extracting of the meat of crabs. Another advantage of the present invention is that it permits the washing of the crab meat at the same time that the meat is being extracted from the shell, water being sprayed from the center of the bowl outwardly.

In carrying out the invention, after the crab meat has been extracted and washed, the washing water is closed off and the centrifugal bowl allowed to run for a short period of time. Due to the perforated construction of the backs of the crab meat containers, moisture to any degree of dryness is removed and preferably all the moisture is removed. It is thus apparent that the present apparatus for treating crab flakes extracts the crab meat from the shell, washes, and dries it in one continuous operation, which usually does not take more than one minute.

One advantage of the present invention is that it does not allow the crab meat or other crustacean to remain warm for any considerable period of time.

The present invention provides a successful mechanical device for the shucking of crab meat from the crab shells and thereby insures a really sanitary product.

The holders or drawers of the present invention being flat can be filled and closed very rapidly and when the covers or doors are closed, the crabs are held in position for shucking of the meat therefrom without danger of getting out of position and thereby preventing the free extraction of the meat.

It is to be noted that in accordance with the present invention when the drawers are placed in the centrifugal bowl and revolved at appropriate speed determined by the circumference of the bowl, the meaty matter in the crab is extracted without breaking the shell thereof.

There is thus provided an improved process for separating the meat from the shells of crustacea and a novel and efficient apparatus of the kind described and for the purpose specified.

It is obvious that changes may be made in the process and apparatus without departing from the material principles involved and it is accordingly to be understood that the invention is not limited to the exact process and apparatus described but is to be understood as fully as broad as the scope of the appended claims.

What is claimed, is:—

1. That process of preparing the meat of crustacea comprising subjecting a crustacean to centrifugal action to separate the meat from the shell and utilizing the same centrifugal action to effect washing of the separated meat.

2. That process of preparing the meat of crustacea comprising subjecting a crustacean to centrifugal action to separate the meat from the shell and utilizing the same centrifugal action to effect washing and drying of the separated meat.

3. That process of preparing the meat of crustacea comprising subjecting a crustacean to the action of a centrifuge to separate the meat from the shell, introducing an aqueous medium to the centrifuge, and continuing the operation of the centrifuge to force the aqueous medium through the separated meat.

4. That process of preparing the meat of crustacea comprising subjecting a crustacean to the action of a centrifuge to separate the meat from the shell, introducing an aqueous medium to the centrifuge, continuing the operation of the centrifuge to force the aqueous medium through the separated meat, and further continuing the operation of the centrifuge to extract the resulting wash medium from the meat and thereby dry the meat.

5. In apparatus for extracting the meat of crustacea from their shells, a cylindrical bowl arranged for rapid revolution on its axis and having a side wall, a series of meat receiving drawers removably mounted in said bowl around the side wall thereof, body holding frames each fitted on a respective drawer toward the center of the bowl, and means extending across said frames and the inner sides of the drawers to support the shells of the crustacea against passage into the drawers.

6. In apparatus for extracting the meat of crustacea from their shells, a cylindrical bowl arranged for rapid revolution on its axis and having a side wall, a series of meat receiving drawers removably mounted in said bowl around the side wall thereof, each of said drawers having its outer side closed by a perforated wall forming a drawer bottom, body holding frames each fitted on a respective drawer toward the center of the bowl, and means extending across said frames and the inner sides of the drawers to support the shells of the crustacea against passage into the drawers.

7. In apparatus for extracting the meat of crustacea from their shells, a cylindrical bowl arranged for rapid revolution on its axis and having a side wall, a series of meat receiving drawers removably mounted in said bowl around the side wall thereof, each of said drawers having its outer side closed by a perforated wall forming a drawer bottom, bosses on the outer faces of said drawer bottoms to hold the drawers spaced from said bowl wall, body holding frames each fitted on a respective drawer toward the center of the bowl, and means extending across said frames and the inner sides of the drawers to support the shells of the crustacea against passage into the drawers.

8. In apparatus for extracting the meat of crustacea from their shells, a cylindrical bowl arranged for rapid revolution in its axis and having a side wall, a series of meat receiving drawers removably mounted in said bowl around the side wall thereof, body holding frames each fitted on a respective drawer toward the center of the bowl, means extending across said frames and the inner sides of the drawers to support the shells of the crustacea against passage into the drawers, and means carried by the bowl for spacing said drawers and frames evenly around the bowl wall.

9. In apparatus for extracting the meat of crustacea from their shells, a cylindrical bowl arranged for rapid revolution on its axis and having a side wall, a series of meat receiving drawers removably mounted in said bowl around the side wall thereof, each of said drawers having its outer side closed by a perforated wall forming a drawer bottom, body holding frames each fitted on a respective drawer toward the center of the bowl, means extending across said frames and the inner sides of the drawers to support the shells of the crustacea against passage into the drawers, and means carried by the bowl for spacing said drawers and frames evenly around the bowl wall.

10. In apparatus for extracting the meat of crustacea from their shells, a cylindrical bowl arranged for rapid revolution on its axis and having a side wall, a series of meat receiving drawers removably mounted in said bowl around the side wall thereof, each of said drawers having its outer side closed by a perforated wall forming a drawer bottom, bosses on the outer faces of said drawer bottoms to hold the drawers spaced from said bowl wall, body holding frames each fitted on a respective drawer toward the center of the bowl, means extending across said frames and the inner sides of the drawers to support the shells of the crustacea against passage into the drawers, and means carried by the bowl for spacing said drawers and frames evenly around the bowl wall.

11. In apparatus for extracting the meat of crustacea from their shells, a cylindrical bowl arranged for rapid revolution on its axis and having a side wall, a series of meat receiving drawers removably mounted in said bowl around the side wall thereof, body holding frames each fitted on a respective drawer toward the center of the bowl, means extending across said frames and the inner sides of the drawers to support the shells of the crustacea against passage into the drawers, and a removable perforated cover normally closing the inner face of each frame.

12. In apparatus for extracting the meat of crustacea from their shells, a cylindrical bowl arranged for rapid revolution on its axis and having a side wall, a series of meat receiving drawers removably mounted in said bowl around the side wall thereof, each of said drawers having its outer side closed by a perforated wall forming a drawer bottom, body holding frames each fitted on a respective drawer toward the center of the bowl, and a removable perforated cover normally closing the inner face of each frame.

13. In apparatus for extracting the meat of crustacea from their shells, a cylindrical bowl arranged for rapid revolution on its axis and having a perforated side wall, a series of meat receiving drawers removably mounted in said bowl around the side wall thereof, body holding frames each fitted on a respective drawer toward the center of the bowl, means extending across said frames and the inner sides of the drawers to support the shells of the crustacea against passage into the drawers, a removable perforated cover normally closing the inner face of each frame, a drain pan surrounding the bowl and receiving water from the perforated side wall, and means to draw off water from the drain pan.

14. In apparatus for extracting the meat of crustacea from their shells, a cylindrical bowl arranged for rapid revolution on its axis and having a perforated side wall, a series of meat receiving drawers removably mounted in said bowl around the side wall thereof, each of said drawers having its outer side closed by a perforated wall forming a drawer bottom, body holding frames each fitted on a respective drawer toward the center of the bowl, a removable perforated cover normally closing the inner face of each frame, a drain pan surrounding the bowl and receiving water from the perforated side wall, and means to draw off water from the drain pan.

15. In apparatus for extracting the meat of crustacea from their shells, a cylindrical bowl arranged for rapid revolution on its axis and having a perforated side wall, a series of meat receiving drawers removably mounted in said bowl around the side wall thereof, body holding frames each fitted on a respective drawer toward the center of the bowl, means extending across said frames and the inner sides of the drawers to support the shells of the crustacea against passage into the drawers, a removable perforated cover normally closing the inner face of each frame, a drain pan surrounding the bowl and receiving water from the perforated side wall, means to draw off water from the drain pan, and a removable spray tube adapted for insertion in said bowl.

16. In apparatus for extracting the meat of crustacea from their shells, a cylindrical bowl arranged for rapid revolution on its axis and having a perforated side wall, a series of meat receiving drawers removably mounted in said bowl around the side wall thereof, each of said drawers having its outer side closed by a perforated wall forming a drawer bottom, body holding frames each fitted on a respective drawer toward the center of the bowl, a removable perforated cover normally closing the inner face of each frame, a drain pan surrounding the bowl and receiving water from the perforated side wall, means to draw off water from the drain pan, and a removable spray tube adapted for insertion in said bowl.

17. In an apparatus for extracting the meat of crustacea from their shells, a container arranged for rapid revolution on its axis, a meat receiving drawer removably mounted in said container, a body holding frame fitted on the drawer, and means extending across said frame and the inner sides of the drawer to support the shells of the crustacea to prevent passage of shells into the drawer.

18. In an apparatus for extracting the meat of crustacea from their shells, the combination of a container arranged for rapid revolution on its axis and provided with means for allowing wash water to be drawn therefrom, a meat receiving drawer mounted in said container and provided with exits for an aqueous washing medium, a body holding frame fitted on the drawer, means for supporting the shell of the crustacean to prevent passage of the shell into the drawer, and means for conducting a washing medium to said frame to wash the meat separated from said crustacean.

19. In an apparatus for extracting the meat of crustacea from their shells, the combination of a container arranged for rapid revolution on its axis and provided with means for allowing wash water to be drawn therefrom, meat receiving means mounted in said container and provided with exits for the aqueous washing medium, means for supporting a crustacean with its its shell adjacent said meat receiving means to prevent the passage of said shell into the meat receiving means, and means for applying a washing medium to the crustacean.

20. In an apparatus for extracting the meat of crustacea from their shells, the combination of a container arranged for rapid revolution on its axis and provided with means for allowing wash water to be drawn therefrom, meat receiving means mounted in said container and provided with exits for the aqueous washing medium, means for supporting a crustacean with its shell adjacent said meat receiving means to prevent the passage of said shell into the meat receiving means, means for applying a washing medium to the crustacean, and means for extracting the washing medium from said washed meat.

21. In an apparatus for extracting the meat of crustacea from their shells, the combination of a container arranged for rapid revolution on its axis and provided with means for allowing wash water to be drawn therefrom, meat receiving means mounted in said container and provided with exits from the aqueous washing medium, means for supporting a crustacean with its shell adjacent said meat receiving means to prevent the passage of said shell into the meat receiving means, means for applying a washing medium to the crustacean, means for extracting the washing medium from said washed meat, and means for drying said washed meat.

22. In an apparatus for extracting the meat of crustacea from their shells, the combination of a container arranged for rapid revolution on its axis and provided with means for allowing wash water to be drawn therefrom, meat receiving means mounted in said container and provided with exits for the aqueous washing medium, means for supporting a crustacean with its shell adjacent said meat-receiving means to prevent the passage of said shell into the meat receiving means, means for applying a washing medium to the crustacea, means for permitting the periodic removal of the shells of the separated crustacea, and means for permitting the removal of the separated meat from the container.

23. In an apparatus for extracting the meat of crustacea from their shells, the combination of a container arranged for rapid revolution on its axis and provided with means for allowing wash water to be drawn therefrom, meat receiving means mounted in said container and provided with exits for the aqueous washing medium, means for supporting a crustacean with its shell adjacent said meat-receiving means to prevent the passage of said shell into the meat receiving means, means for applying a washing medium to the crustacea, said container being provided with a movable closure member for enabling the separated shells of the crustacea to be removed, and means for permitting the removal of the meat from the container.

24. In an apparatus for extracting the meat of crustacea from their shells, the combination of a crutacean container, meat-receiving means mounted in said container, means for supporting a crustacean with its shell adjacent said meat-receiving means to prevent the passage of said shell into the meat-receiving means, means for supplying a washing medium to said meat, and centrifugal means for separating said meat from the shell, for extracting the washing medium from the washed meat, and for drying said washed meat.

PETER A. DUBUS.